US007562818B1

(12) United States Patent
Bierbaum et al.

(10) Patent No.: US 7,562,818 B1
(45) Date of Patent: Jul. 21, 2009

(54) MOBILE DEVICE HAVING A TRANSIT CARD APPLICATION

(75) Inventors: Christopher J. Bierbaum, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 157 days.

(21) Appl. No.: 11/752,028

(22) Filed: May 22, 2007

(51) Int. Cl.
*G07B 15/02* (2006.01)
*G06F 17/00* (2006.01)

(52) U.S. Cl. ....................................... 235/384; 235/375

(58) Field of Classification Search ................. 235/375, 235/384, 492; 705/13
See application file for complete search history.

(56) References Cited

U.S. PATENT DOCUMENTS 5,819,234 A * 10/1998 Slavin et al. ............... 340/10.4
5,991,749 A * 11/1999 Morrill, Jr. ................... 705/44
7,224,291 B2 * 5/2007 Hassett ........................ 340/928
2008/0116264 A1 * 5/2008 Hammad et al. ............ 235/382

OTHER PUBLICATIONS

Zhu, Kevin, Patent Application entitled, "Dynamic Smart Card Application Loading," filed Sep. 27, 2007, U.S. Appl. No. 11/863,228.

* cited by examiner

*Primary Examiner*—Thien Minh Le
*Assistant Examiner*—April A Taylor

(57) ABSTRACT

A system is provided for using a transit card application for providing access to a fare gate. The system includes a server and a mobile device. The mobile device determines whether a balance on the transit card application is below a threshold, and requests an approval for a balance increase from the server in response to determining that the balance on the transit card application is below the threshold. The server determines whether a predetermined payment source has sufficient value for the balance increase in response to the request for the approval from the mobile device, and approves the request in response to determining that the predetermined payment source has sufficient value for the balance increase. The mobile device promotes increasing the balance on the transit card application in response to the approval by the server.

20 Claims, 5 Drawing Sheets

Fig. 4
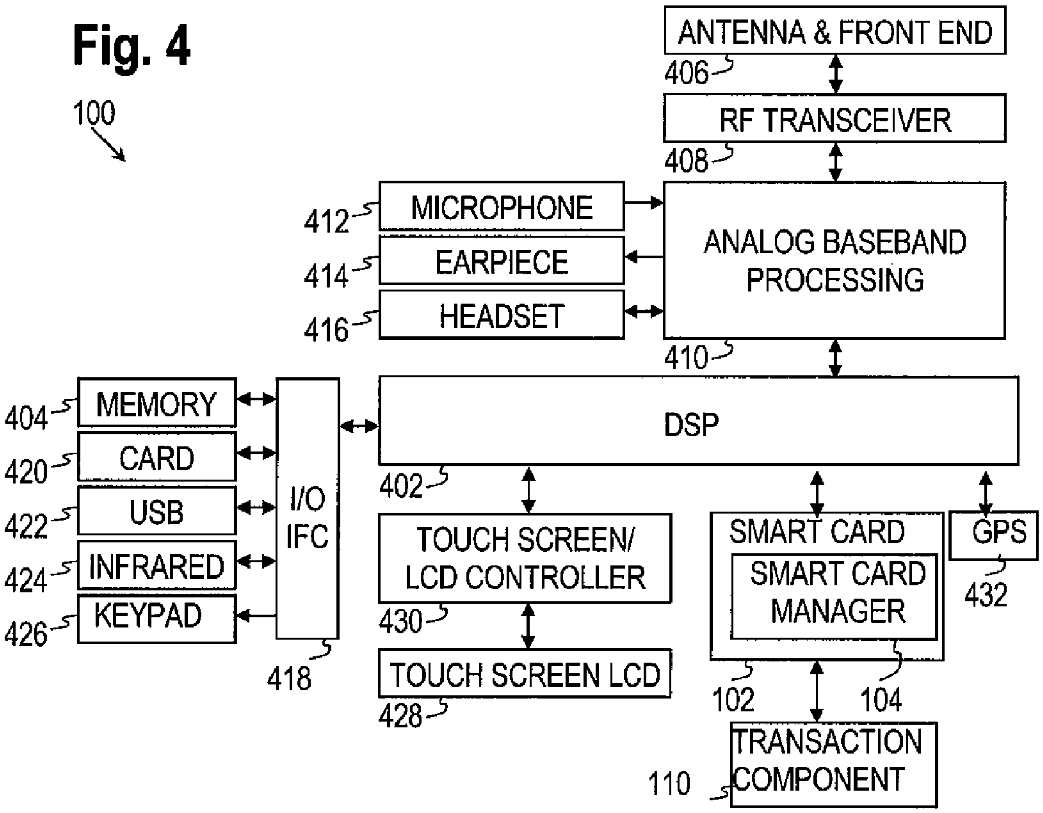
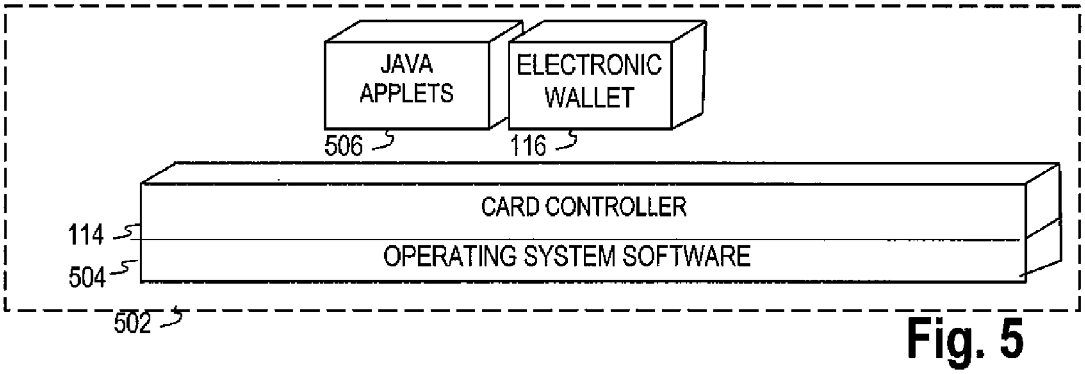
Fig. 5

MOBILE DEVICE HAVING A TRANSIT CARD APPLICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transaction devices are portable items that store data, such as credit cards, debit cards, gift cards, access cards, and cards for various prepaid services or goods. Magnetically encoded transaction devices typically store data in a magnetic strip. A transaction device can be a transit card that is issued by a transit authority, such as a subway system. A transit card may store value that is used to make automatic payments at, for example, subway station fare gates, thereby providing access to restricted areas.

A transit card may be a “proximity read” transit card, which may communicate with a card reader without physically contacting the card reader. Communication between a proximity read transit card and various types of card readers may occur via a radio frequency signal, optical signal, wireless internet connection, or other communication method known in the art. As a user of a transit card passes through a fare gate, a card reader may cause value to be automatically deducted from value stored on the transit card.

The fare gate can determine whether the balance of the value remaining on the transit card is below a threshold amount. The threshold amount might be set, for example, to an average fare cost of a typical or average trip. If the value is below the threshold, the fare gate can verify whether a predetermined payment source, such as a credit card, has been provided to pay for increasing the value stored on the transit card. If a predetermined payment source has been provided, the fare gate can provide access through the fare gate to the user of the transit card, and charge the predetermined payment source and transfer funds to “top up” the value on the transit card by increasing the value stored on the transit card by a specified amount.

The fare gate has time to verify whether the transit card is a type of transit card that can have its balance increased by the fare gate. However, the fare gate does not have time to provide for the balance increase on the transit card or to verify whether a predetermined payment source has sufficient balance or credit to provide for the balance increase on the transit card. The fare gate may send requests to verify whether predetermined payment sources have sufficient balance to the transit authority’s data processing system. The transit authority’s data processing system may batch these requests for verification at a later time when data processing systems are less congested, such as after midnight. If the predetermined payment source for a transit card has exceeded its credit limit, the transit authority’s data processing system will not verify this insufficient balance until after midnight, which can result in the fare gates continuing to allow access to the user of the transit card for the rest of the day. The transit authority may not be able to subsequently collect for many of these prematurely approved balance increases, which may cost the transit authority significant amounts in lost revenue.

SUMMARY

The present disclosure provides systems and methods for using a transit card application for providing access to a fare gate. In some embodiments, the system includes a mobile device and a server. The mobile device determines whether a balance on the transit card application is below a threshold, and requests an approval for a balance increase from the server in response to determining that the balance on the transit card application is below the threshold. The server determines whether a predetermined payment source has sufficient value for the balance increase in response to the request for the approval from the mobile device, and approves the request in response to determining that the predetermined payment source has sufficient value for the balance increase. The mobile device promotes increasing the balance on the transit card application in response to the approval by the server.

In some embodiments, the mobile device executes a location fix technology to determine a location fix and calculates the threshold from an anticipated fare expense based on the location fix. If the predetermined payment source does not have sufficient value for the balance increase, the mobile device displays a warning message.

In some embodiments, the mobile device may also enable switching from the predetermined payment source to an alternative predetermined payment source if the predetermined payment source does not have sufficient value for the balance increase.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 shows a block diagram of an illustrative mobile device.

FIG. 5 shows a block diagram of an illustrative software configuration for a mobile device according to some embodiments of the present disclosure.

DETAILED DESCRIPTION

Figure 1:
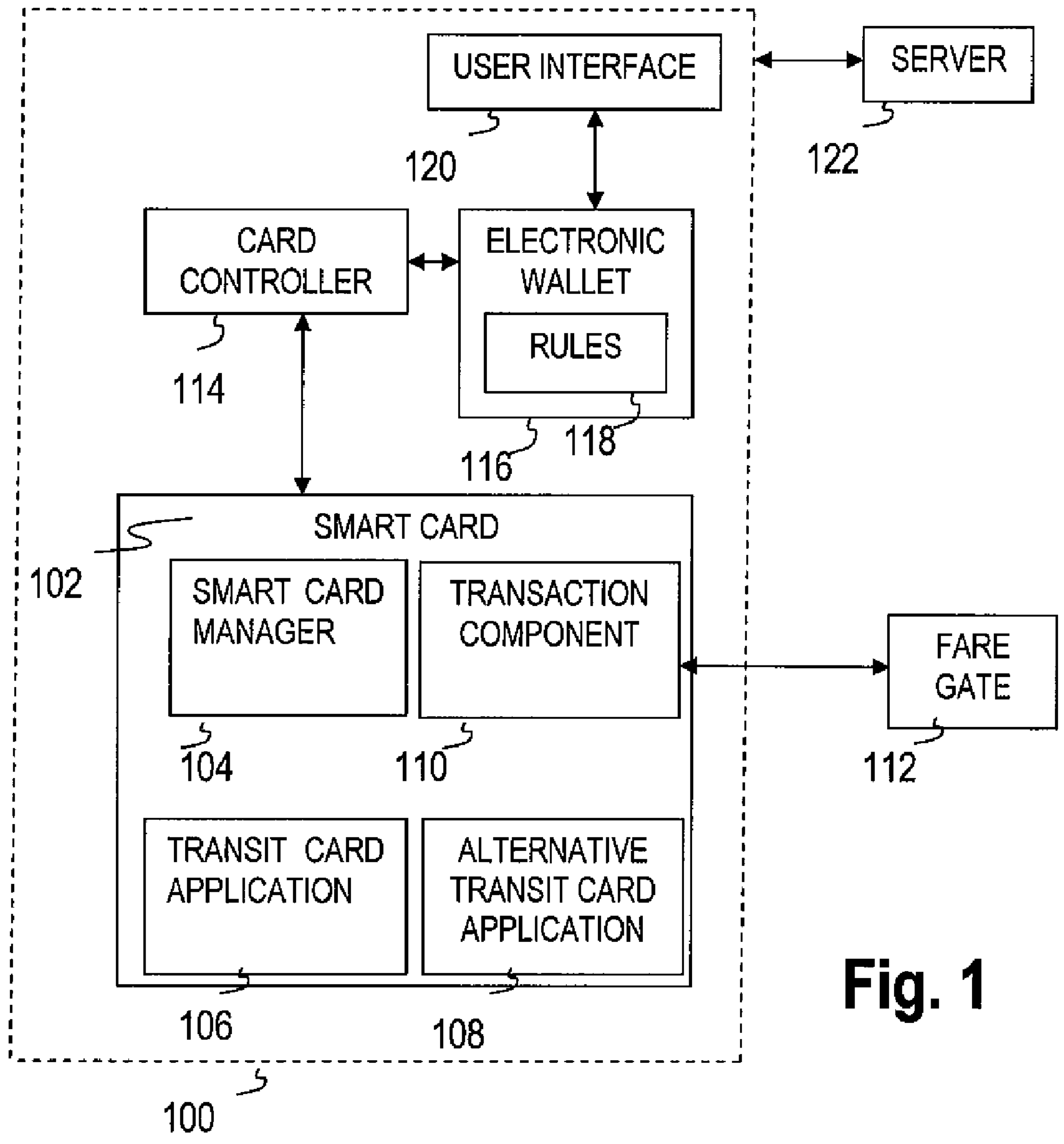
FIG. 1 shows a block diagram of a system for a mobile device having transit card applications according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A mobile device, such as a mobile phone, may include a transit card. When a card reader is present at a location where proximity read transit cards are used, the transit card in the mobile device may make payments, provide access to restricted areas, and perform other functions or transactions typically performed by transit cards. A mobile device may implement the functionality of multiple transit cards by containing a "smart card" that contains multiple transit card applications. A smart card is a transaction device that stores data in nonvolatile memory, and typically contains data processing circuitry that offers some degree of computing capacity. A transit card application is an application running in a smart card environment. Multiple transit card applications on a smart card enable the mobile device to emulate a different transit card for each corresponding transit card application.

Embodiments of the present disclosure enable a balance increase on a transit card based on whether a predetermined payment source has sufficient value. Instead of threshold determinations made when passing a fare gate, a mobile device frequently determines whether a balance on a transit card application is below a threshold. If the balance on the transit card application is below the threshold, the mobile device communicates over the air with a server to request an approval for a balance increase. Without waiting until data processing costs are low, such as midnight, the server determines whether a predetermined payment source has sufficient value for the balance increase. Within a shortened period of time, the server approves the request if the predetermined payment source has sufficient value for the balance increase. The mobile device responds to an over the air approval by the server by promoting the increase of the balance on the transit card application. Promptly verifying whether the predetermined payment source has sufficient value significantly reduces the chances that fare gates provide access to transit card users without payment of fares. If the predetermined payment source, such as a credit card, does not have enough credit to top up the balance on the transit card application, then the next occasion, even on the same day, the fare gate will deny access to the user of the transit card application. This denial saves funds for the transit authority that might have otherwise been approved as a top up and lost.

In some embodiments of the present disclosure, the mobile device executes a location fix technology to calculate the mobile device's movement within a transit system and calculates anticipated fare expenses based on the movement. If the balance on the transit card application is insufficient to meet the anticipated fare expenses and the predetermined payment source does not have sufficient value for any balance increase, the mobile device displays a warning message, such as "transit card funds are insufficient to pay for travel beyond the next gate, please exit at the next gate."

In other embodiments of the present disclosure, a user interface on the mobile device may provide options to enable a user to switch to a second predetermined payment source, such as a different credit card, if a first predetermined payment source does not have sufficient value or credit to provide funds to increase the balance on a transit card.

FIG. 1 shows a block diagram of a system for a mobile device 100 having transit card applications according to an embodiment of the present disclosure. The mobile device 100 may include a smart card 102, which may include a smart card manager 104. The smart card manager 104 may activate, deactivate, and assist a user in managing transit card applications, such as a transit card application 106 and an alternative transit card application 108, on the smart card 102 for a transaction. Additionally, a server may activate, deactivate, and assist a user in managing transit card applications. While two transit card applications are shown in FIG. 1, other numbers are also contemplated. The mobile device 100 may include a transaction component 110 to enable the smart card 102 to communicate with a vendor device by radio frequency, optical, infra-red, wired, magnetic "contact reader," or other known or hereafter developed communications. The vendor device may be point of sale, security, or any other vendor transaction device, such as a fare gate 112. The security for the smart card 102 may be enabled by hardware or software components on the mobile device 100, as part of the smart card 102, or combinations of both.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, robustness of the card, and the functionality. The standard for contactless smart card communications is ISO/IEC 14443, dated 2001. An alternative standard for contactless smart cards is ISO 15693, which allows communications at distances up to 50 cm. However, systems applying other standards may be used and are within the spirit and scope of the present disclosure.

The mobile device 100 contains a card controller 114 and an electronic wallet 116. The card controller 114 may enable the electronic wallet 116 to communicate with the smart card manager 104 on the smart card 102. The card controller 114 is responsible for accessing the hardware registers of the smart card manager 104 and often includes an interrupt handler to service interrupts generated by the smart card manager 104. The electronic wallet 116 is an application that, in addition to providing the mobile device user with information regarding transit card applications, may enable the user to access and select transit card applications on the smart card 102 for use in carrying out transactions. The electronic wallet 116 contains or has access to a set of context-based rules 118. The electronic wallet 116 may process the rules 118 and context information to determine which of the transit card applications 106 or 108 are appropriate for a transaction.

The mobile device 100 may also include a user interface 120, which enables a user of the mobile device 100 to enter input to and receive output from the mobile device 100. The mobile device 100 may also communicate with a server 122 for mobile device communication. The mobile device 100, the user interface 120, and the server 122 are described in more detail below in reference to FIGS. 3 to 6.

Figure 2:
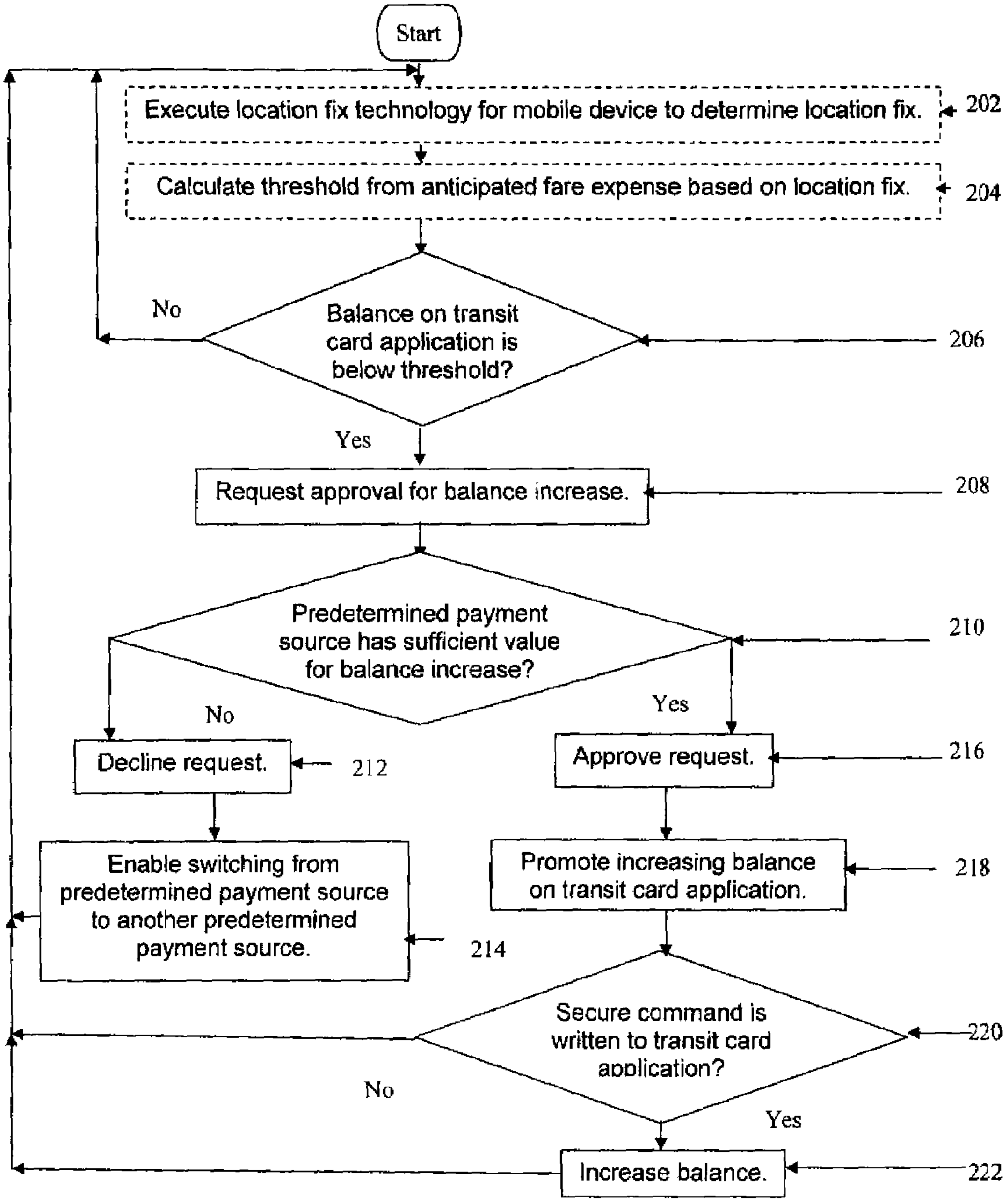
FIG. 2 shows a flowchart of a method for a mobile device having transit card applications according to some embodiments of the present disclosure.

FIG. 2 is a flowchart illustrating an embodiment of a method for a mobile device having transit card applications according to an embodiment of the present disclosure. A mobile device may use the method to select a transit card application, to increase the balance on a transit card application, and to enable a user to switch to another predetermined payment source if an initial predetermined payment source does not have sufficient value to increase the balance on the transit card application.

In box 202, the mobile device 100 optionally executes a location fix technology to determine a location fix. The location fix technology can be an advanced forward link trilateration technology, a global positioning system technology, or a hybrid location fix technology. For example, the mobile device 100 can execute a global positioning system technology to determine that the mobile device 100 is moving east-bound in a train located in a New York City transit system.

In box 204, the mobile device 100 optionally calculates a threshold from an anticipated fare expense based on the location fix. For example, the mobile device 100 can reference a fare list for east-bound trains in the New York City transit system based on the location fix. The fare list can be stored on the mobile device 100 or on the server 122. Based on the fare list, the mobile device 100 determines that the mobile device 100 can travel on the train to two more fare gates, a first fare gate that will charge the transit card application $2.50 and a second fare gate that will charge the transit card application $5.00. Based on these anticipated fare expenses, the mobile device 100 can set the threshold at $5.00.

In box 206, the mobile device 100 determines whether the balance on the transit card application is below a threshold. The mobile device 100 can periodically determine whether the balance on the transit card application is below the threshold, such as on an hourly basis. Alternatively, the mobile device 100 can determine whether the balance on the transit card application is below the threshold based on an inquiry input by the user of the mobile device 100. Additionally, the fare gate 112 can determine whether the balance on the transit card application is below the threshold. For example, the mobile device 100 determines whether the balance on the transit card application 106 is below a threshold of $10.00 because $10.00 might be, for example, the maximum cost for a round-trip in a particular transit system. In some embodiments, the user interface 120 can enable the user of the mobile device 100 to set the threshold. In other embodiments, however, the transit card, fare gate, transit authority, or anticipated fare expense based on location might set the threshold.

The mobile device 100 can select a transit card application for a transaction. For example, a user using the mobile device 100 selects the transit card application 106 for a transaction at the fare gate 112 prior to presenting the mobile device 100 to the fare gate 112. The user interface 120 can display an account number, an account limit, an account balance, and a transaction history for the transit card applications before, during, and after the selection of any transit card application. Furthermore, the user interface 120 can display a transit schedule and a fare list that can assist the user of the mobile device 100 in selecting the transit card application for a transaction.

The mobile device 100 may select the appropriate transit card application to be employed in a particular situation based on the rules 118 for the context of the situation, wherein the context may be a set of interrelated conditions or circumstances that may apply to the situation. The context may include, but is not limited to, the most recently used transit card application, the location where the transaction may occur, the transit card applications that may be accepted at the location, and the balance on the transit card application that may be used for the transaction.

One rule may recognize that only a certain transit card is accepted at a location where a transaction is to be conducted. The location at which a transaction is to be conducted may be determined by information received from the fare gate 112 at the location. Alternatively, a global positioning system or similar satellite-based positioning system may be used to determine the location. Other rules may specify that a default transit card application may be used unless the mobile device user selects a different transit card application or that the most recently used transit card application may be used for all transactions until the mobile device user changes the rule.

In one example, the mobile device user uses the electronic wallet 116 to select the transit card application 106 or 108 in anticipation of a transaction. In another example, the mobile device 100 may be brought into the proximity of the fare gate 112 at a transit location. Then context information may be sent from the fare gate 112 to the transaction component 110, which may convey the context information to the smart card manager 104. Next, the smart card manager 104 may recognize that one of transit card application 106 or 108 needs to be selected for a transaction. Subsequently, the smart card manager 104 may send a signal to the electronic wallet 116 through the card controller 114 that smart card application 106 or 108 needs to be selected.

Based on the rules 118 and any context information, the electronic wallet 116 may automatically select a smart card application for a transaction. In another example based on the rules 118 and any context information, the electronic wallet 116 may provide the option of selecting a transit card application to the mobile device user through the user interface 120.

The mobile device user may use the user interface 120 to select one of the transit card applications 106 or 108 for the transaction. In an example, if the rules 118 and the context information indicate that the mobile device user is to select a transit card application, the electronic wallet 116 may choose transit cards applications to present to the mobile device user. Then the electronic wallet 116 prompts the mobile device user to select one of the chosen transit card applications for the transaction via a list of transit card applications presented by the user interface 120. Next, the mobile device user selects one of the transit card applications to be used. Subsequently, the electronic wallet 116 conveys this selection through the card controller 114 to the smart card manager 104.

In yet another example, if there is not enough context information for the electronic wallet 116 to select the transit card application 106 or 108, the user interface 120 on the mobile device 100 can offer a list of appropriate transit card applications to the mobile device user. When the mobile device user manually selects transit card application 106 or 108 from this list, the electronic wallet 116 conveys this selection through the card controller 114 to the smart card manager 104.

In any of the examples, the electronic wallet 116 may remember the selection made by the mobile device user and apply the selection to refine the context-based rules 118. That is, in a similar context in the future, the electronic wallet 116 may automatically select the same transit card application that the mobile device user selected manually or may offer that transit card application to the mobile device user as the preferred transit card application for the current context.

The mobile device 100 can determine whether the balance on the selected transit card application is below the threshold in response to a gate event, a period of time passed, or a request by the user of the mobile device 100 to access information for the transit card application. For example, the mobile device 100 might only check the balance at the fare gate 112, might check the balance every few seconds, minutes, or so on, or check based on other events such as a location proximity to the fare gate 112. In this manner, the mobile device 100 reduces the time when the balance on the transit card application is below the threshold by frequently determining whether the balance on the transit card application is below the threshold.

If the mobile device 100 determines that the balance on the transit card application is not below the threshold, the method returns to box 202 because the balance on the transit card application is more than sufficient for any or most potential fares. If the mobile device 100 determines that the balance on the transit card application is below the threshold, the method continues to box 208 because the balance on the transit card application is insufficient for some potential fare expenses or anticipated far expenses.

In box 208, the mobile device 100 requests approval for a balance increase. For example, the mobile device 100 requests approval for a balance increase of $40.00 from the server 122, thereby increasing the balance on the transit card application 106 from $9.00 to $49.00. The user interface 120 can inform the user of the mobile device 100 that the balance on the transit card application 106 is below the threshold. The user interface 120 can also enable the user of the mobile device 100 to set the value for the balance increase. In some embodiments, the user interface 120 can display a message to determine if the user of the mobile device 100 wants the balance increase for the transit card application 106 before the mobile device 100 requests approval for the balance increase.

If a communication problem prevents the mobile device 100 from requesting approval for the balance increase from the server 122, the electronic wallet 116 can conditionally approve the balance increase, and the method proceeds to box 218. However, once the communication problem ends, the mobile device 100 can verify the conditional approval by requesting approval from the server 122. If the server 122 does not approve the request for the balance increase, the electronic wallet 116 can roll back the conditional approval by removing the balance increase amount associated with the conditional approval from the transit card application.

In box 210, the server 122 determines whether a predetermined payment source has sufficient value for a balance increase. The predetermined payment source can be a loyalty card, an identification card, a credit card, a coupon card, a security card, a debit card, a bank account, a mobile device service provider bill, or other type of cash card. For example, the service provider for the mobile device 100 can charge the user of the mobile device 100 for the balance increase. Additionally, the predetermined payment source can be another mobile device that has an electronic wallet. For example, the server 122 determines whether a credit card has sufficient value or available creditor balance to fund the increase of $40.00 before the user of the mobile device 100 presents the mobile device 100 to a subsequent or later fare gate. The electronic wallet 116 can automatically default to a predetermined payment source. If no predetermined payment source has been selected as a default for the balance increase, the mobile device 100 can prompt the user to select a predetermined payment source for the balance increase. If the server 122 determines that the predetermined payment source does not have sufficient value for the balance increase, the method continues to box 212 to decline the request. If the server 122 determines that the predetermined payment source has sufficient value for the balance increase, the method proceeds to box 216 to approve the request.

The server 122 may also determine whether the mobile device 100, and hence the transit card application 106, has not been reported as lost or stolen. If the mobile device 100 is reported as lost or stolen, the server 122 can disable the transit card applications on the mobile device 100. If the server 122 cannot disable the transit card applications over the air, the server can communicate the status of the mobile device 100 to the fare gate 112. In response to a report of a stolen or lost mobile device, the fare gate 112 can either disable the transit card applications on the mobile device 100 or deny entry to the transit system to the current user of the mobile device 100.

In box 212, the server 122 declines the request. For example, the server 122 receives a payment decline from the predetermined payment source for a balance increase of $40.00 because, for example, the credit card is already over its credit limit.

In box 214, the mobile device 100 enables switching from the predetermined payment source to another predetermined payment source. For example, the mobile device 100 enables switching from the predetermined payment source that is less than $40.00 from exceeding its credit limit to another predetermined payment source that may be more than $40.00 from exceeding its credit limit. The mobile device 100 may display selections of other predetermined payment sources on the user interface 120 from which the user of the mobile device 100 can select. After enabling the switching, the method returns to box 202 to repeat the method.

The mobile device 100 may also display a warning message on the user interface 120 based on whether the balance on the transit card application on the mobile device 100 is insufficient for an anticipated fare expense. The warning message can be a suggestion to exit at an upcoming fare gate or a suggestion to switch from the predetermined payment source to another predetermined payment source For example, the balance on the transaction card application is $3.00, a global positioning system for the mobile device 100 determines that the mobile device 100 is traveling east-bound on a train towards two fare gates in a New York City transit system, and the fare list stored on the mobile device 100 for the transit system lists fares as $2.50 for the first gate and $5.00 for the second gate. In response to this situation, the mobile device 100 displays a warning message on the user interface 120. The user of the mobile device 100 can respond to the warning message by entering input in the mobile device 100 to request approval for a balance increase to the transit card application. The user can also switch from a first predetermined payment source to a second predetermined payment source if the first predetermined payment source does not have sufficient value for the balance request. If the second predetermined payment source does not have sufficient value for the balance request, the message displayed on the user interface 120 can warn the user of the mobile device 100, "transit card funds are insufficient to pay for travel beyond the next gate, please exit at the next gate." In response to this message, the user can exit at the first fare gate to avoid problems and delays associated with obtaining a transit system payment waiver.

If no other predetermined payment source has sufficient value for the balance increase, subsequent far gates may deny entry to the user of the mobile device 100. Alternatively, subsequent fare gates may permit entry for a transit card application with a balance below the threshold provided that the transit card application has sufficient balance to cover the current transit fare, and only deny entry to the user of the mobile device 100 if the balance is less than the current transit fare.

In box 216, the server 122 approves the request. For example, the server 122 approves the request for a balance increase of $40.00 because the predetermined payment source for the transit card application 106 has sufficient credit to fund the transaction.

In box 218, the mobile device 100 promotes increasing the balance on the transit card application. For example, the mobile device 100 promotes increasing the balance on the transit card application 106 by $40.00 by writing a secure command to the transit card application 106. The amount of increase in the balance on the transaction card application can be a default amount that is automatically selected for each increase, where the default amount may be modified by the user of the mobile device. Alternatively, the user of the mobile device 100 can enter input to the mobile device 100 to select the amount of increase in the balance on the transaction card application.

In box 220, the fare gate 112 determines whether a secure command is written to the transit card application. Alternatively, either the electronic wallet 116 or the server 122 can determines whether a secure command is written to the transit card application. For example, the fare gate 112 determines whether a secure command, indicating that the predetermined payment source has sufficient value, is written to the transit card application 106. If the fare gate 112 determines that a secure command is not written to the transit card application, the method returns to box 202 and the balance on the transit card application 106 is not increased. If the fare gate 112 determines that a secure command is written to the transit card application, the method continues to box 222 to increase the balance on the transit card application 106.

In box 222, the fare gate 112 increases the balance on the transit card application 106. Alternatively, either the electronic wallet 116 or the server 122 can increase the balance on the transit card application 106. For example, the fare gate 112 increases the balance on the transit card application 106 by $40.00 from $9.00 to $49.00.

Applying the methods described above, the electronic wallet 116 may select the appropriate transit card application 106 or 108 for a first fare gate. The selected transit card application may be activated and communicate information with an entry fare gate. Subsequently, the entry fare gate may process the information appropriately, for example by opening a gate to permit the user of the mobile device 100 to enter a transit system. When the user presents the mobile device 100 to an exit fare gate, the exit fare gate may process the information appropriately, for example by opening a gate to permit the user of the mobile device 100 to exit the transit system and by deducting a value from the selected transit card application. The value deducted from the selected transit card application can be based on the distance traveled through the transit system, which can be based on the distance between the entry fare gate and the exit fare gate.

Figure 3:
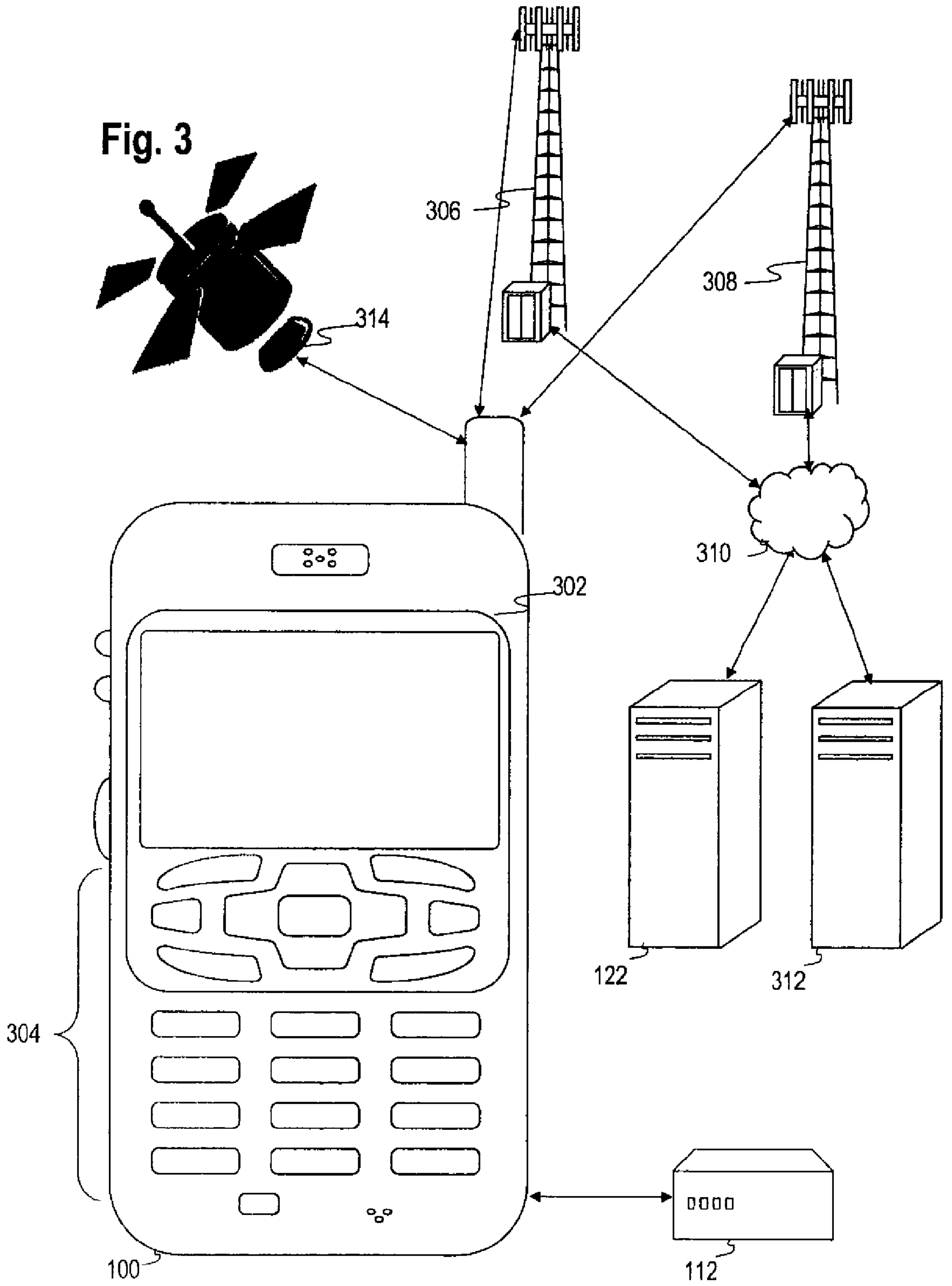
FIG. 3 shows an illustrative wireless communications system.

FIG. 3 shows a wireless communications system which provides the context for the systems and methods of the present disclosure. The wireless communication system includes the mobile device 100. Though illustrated as a mobile phone, the mobile device 100 may take various forms including a personal digital assistant (PDA), a mobile computer, a digital camera, a digital music player, and an electronic key fob for keyless entry. Many suitable mobile devices combine some or all of these functions.

The mobile device 100 includes a display 302 and a touch-sensitive surface or keys 304 with which to interact with a user. The user interface 120 can include the display 302 and the keys 304. The mobile device 100 may present options for the user to select, controls for the user to actuate, and/or cursors or other indicators for the user to direct. The mobile device 100 may further accept data entry from the user, including numbers to dial or various parameter values for configuring the operation of the mobile device 100. The mobile device 100 may further execute one or more software or firmware applications in response to user commands. These applications may configure the mobile device 100 to perform various customized functions in response to user interaction.

The mobile device 100 may communicate through either a first cell tower 306 or a second cell tower 308 and through a wired or wireless network 310 to access information on various servers, such as the server 122. The server 122 may interact with a payment source server 312 through the wired network 310. While two servers are shown in FIG. 3, other servers could be present. The server 122 may act as a gateway to the payment source server 312, which may include information needed by the electronic wallet 116 to verify whether to increase the balance on transit card applications on the smart card 102. The payment source server 312 may interact with the server 122, which may communicate with the mobile device 100 through the wired network 310 and either the first cell tower 306 or the second cell tower 308 by a standard wireless telephony protocol (such as code division multiple access), a wireless internet connection, or some other means of wireless communication. Additionally, the mobile device 100 may communicate with a global positioning satellite 314 to determine the location of the mobile device 100.

In some embodiments of the present disclosure, the mobile device 100 can execute a location fix technology to generate a location fix and use the location of the mobile device 100 as described in FIG. 3. For example, the mobile device 100 can execute a global positioning system technology, an advanced forward link trilateration technology, or a hybrid location fix technology to determine the location of the mobile device 100.

Global positioning system satellites transmit signals that are received by the mobile device 100. The mobile device 100 triangulates its position based on the different signals received from different satellites. The location accuracy is environment driven and dependant on the type of equipment used. The global positioning system technology is owned and operated by the U.S. Department of Defense, but is available for general use around the world. The global positioning system technology requires a direct line of sight between the mobile device 100 and four or more satellites to fix the location of the mobile device, such as when the mobile device is outdoors. Although the global positioning system technology provides high accuracy location fixes, this technology often cannot provide location fixes for mobile devices that are indoors. Because of the time and the battery power required to measure signals from multiple satellites and to triangulate the location fix, the mobile device 100 executes the global positioning system technology in background infrequently for periodic determinations of location fixes.

Furthermore, the mobile device 100 can use advanced forward link trilateration technology to determine its position based on the different radio frequency signals received from different cell towers, such as the first cell tower 306 and the second cell tower 308. Each serving cell tower broadcasts a system parameters information message to the mobile device 100. This message includes the longitude and the latitude of the serving cell tower. The radius covered by serving cell towers vary greatly, from hundreds of meters in dense urban areas to 20 miles or more in rural environments.

The advanced forward link trilateration technology fixes the location of the mobile device 100 based on measurements taken of time and distance signals from nearby cell towers. The mobile device 100 reports the time and distance measurements to the network 310, then the network 310 triangulates a location fix of the mobile device 100, and reports the location fix back to mobile device 100. In general, more than three surrounding cell towers are required to triangulate an optimal location fix. Because of the time required to measure signals from multiple cell towers, to report the measurements to the network 310, to triangulate the location fix, and to report the location fix back to the mobile device 100, the advanced forward link trilateration technology requires significant amounts of both time and resources from the mobile device 100 and the network 310. Therefore, although the advanced forward link trilateration technology determines high accuracy location fixes, the mobile device 100 executes the advanced forward link trilateration technology in background infrequently for periodic determinations of location fixes.

The mobile device 100 can use a hybrid technology to fix the location of the mobile device 100 based on a combination of other location fix technologies. For example, if the mobile device 100 is indoors, but close to a window, the global positioning system technology in combination with a cell tower location technology can calculate the location fix for the mobile device 100. When the mobile device 100 is indoors, the mobile device 100 may receive signals from an insufficient number of satellites to triangulate the position of the mobile device 100. However, the hybrid technology can combine the signals from the insufficient number of satellites with the cell tower location identified by the channel length modulation (CLM) to calculate a hybrid location fix for the mobile device 100.

FIG. 4 shows a block diagram of the mobile device 100. The mobile device 100 includes a digital signal processor (DSP) 402 and a memory 404. As shown, the mobile device 100 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a keypad 426, a liquid crystal display (LCD) with a touch sensitive surface 428, a touch screen/LCD controller 430, a global positioning system (GPS) sensor 432, the smart card 102, the smart card manager 104 for the smart card 102, and the transaction component 110.

The DSP 402 or some other form of controller or central processing unit operates to control the various components of the mobile device 100 in accordance with embedded software or firmware stored in the memory 404. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 100 to send and receive information from a cellular network or some other available wireless communications network. The RF transceiver 408 provides frequency shifting, e.g., converting received RF signals to baseband and converting baseband transmit signals to RF. The analog baseband processing unit 410 may provide channel equalization and signal demodulation to extract information from received signals, may modulate information to create transmit signals, and may provide analog filtering for audio signals. To that end, the analog baseband processing unit 410 may have ports for connecting to the built-in microphone 412 and the earpiece speaker 414 that enable the mobile device 100 to be used as a cell phone.

The DSP 402 may send and receive digital communications with a wireless network via the analog baseband processing unit 410. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The infrared port 424 and other optional ports such as a Bluetooth interface or an IEEE 802.11 compliant wireless interface may enable the mobile device 100 to function as a transit card, communicating wirelessly with other nearby mobile devices and/or wireless base stations. In some contemplated systems, the mobile device 100 is able to wirelessly exchange information at a point-of-sale when placed near a suitable transceiver, such as the fare gate 112.

The keypad 426 couples to the DSP 402 via the I/O interface 418 to provide one mechanism for the user to make selections, enter information, and otherwise provide input to the mobile device 100. Another input mechanism may be the touch screen display 428, which may also display text and/or graphics to the user. The display controller 430 couples the DSP 402 to the touch screen display 428. The GPS sensor 432 is coupled to the DSP 402 to decode global positioning system signals, thereby enabling the mobile device 100 to determine its position.

FIG. 5 illustrates a software environment 502 that may be implemented by the DSP 402. The DSP 402 executes operating system software 504 that provides a platform from which the rest of the software operates. The operating system software 504 provides drivers for the mobile device hardware with standardized interfaces that are accessible to application software. The operating system software 504 may transfer control between applications running on the mobile device 100. Also shown in FIG. 5 are the card controller 114, Java applets 506, and the electronic wallet 116. The Java applets 506 may configure the mobile device 100 to browse the web, play music, play games, and provide utilities and other functionality.

The card controller 114 is a component that may be implemented as a hardware, firmware, or software device driver. Device drivers often form part of the lowest level of the operating system with which they are linked. Some systems have loadable device drivers which can be installed from files after the operating system is running. The electronic wallet 116 may obtain user input from the keys 304, the keypad 426 or the liquid crystal display (LCD) with a touch sensitive surface 428 through the touch screen/LCD controller 430, and may present output to a mobile device user through the display 302.

Figure 6:
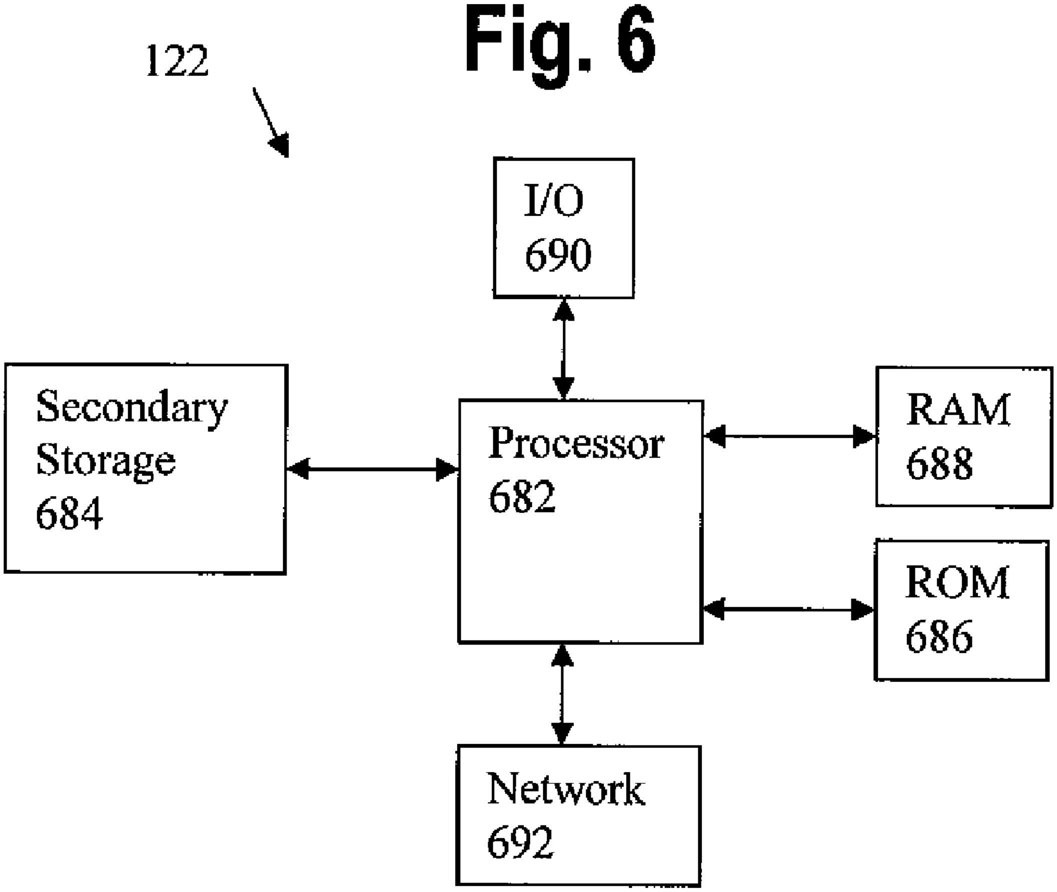
FIG. 6 shows an illustrative general purpose computer system suitable for implementing portions of the several embodiments of the present disclosure.

Parts of the system described above may be implemented on any general-purpose server with sufficient processing power, memory resources, and network throughput capability to handle the necessary workload placed upon it. FIG. 6 illustrates the server 122, which is suitable for implementing one or more embodiments disclosed herein. The server 122 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if the RAM 688 is not large enough to hold all working data. The secondary storage 684 may be used to store programs which are loaded into the RAM 688 when such programs are selected for execution. The ROM 686 is used to store instructions and perhaps data which are read during program execution. The ROM 686 is a non-volatile memory device which typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable. the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for using a transit card application for providing access to a fare gate, comprising:

a server; and a mobile device to determine whether a balance on the transit card application is below a threshold and to request an approval for a balance increase from the server in response to determining that the balance on the transit card application is below the threshold, wherein the server is operable to determine whether a first predetermined payment source has sufficient value for the balance increase in response to the request for the approval from the mobile device and to approve the request in response to determining that the first predetermined payment source has sufficient value for the balance increase, and wherein the mobile device promotes increasing the balance on the transit card application in response to the approval by the server.

2. The system of claim 1 wherein the server is further operable to decline the request in response to determining that the first predetermined payment source does not have sufficient value for the balance increase, and the mobile device is further operable to use a user interface to enable switching from the first predetermined payment source to a second predetermined payment source in response to the server declining the request.

3. The system of claim 1 wherein the first predetermined payment source is at least one of a loyalty card, an identification card, a credit card, a security card, a debit card, a bank account, a mobile device service provider bill, a cash card, and another mobile device that has an electronic wallet.

4. The system of claim 1 further comprising a user interface to display at least one of an account number, an account limit, an account balance, and a transaction history for the transit card application.

5. The system of claim 1 further comprising a user interface to display at least one of a transit schedule and a fare list.

6. The system of claim 1, wherein the mobile device promotes communication with the fare gate via one of a contact communication and a contact-less communication for the transaction.

7. The system of claim 6 wherein the communication is further defined as one of a radio frequency communication, optical communication, and infra-red communication.

8. The system of claim 1 wherein the mobile device is further operable to determine whether the balance on the transit card application is below the threshold in response to one of a gate event, a period of time passed, and a request by a user of the mobile device to access information for the transit card application.

9. A method for using a transit card application comprising:

presenting the mobile device at a first fare gate;

determining whether a balance on the transit card application on the mobile device is below a threshold and enabling access for the mobile device at the first fare gate;

requesting an approval for a balance increase in response to determining that the balance on the transit card application is below the threshold;

in response to the request for the approval, determining whether a first predetermined payment source has sufficient value for the balance increase prior to presenting the mobile device at a second fare gate;

if the first predetermined payment source has sufficient value for the balance increase:

approving the request, and promoting increasing the balance on the transit card application in response to the approval;

if the first predetermined payment source does not have sufficient value for the balance increase:

declining the request, and enabling switching from the first predetermined payment source to a second predetermined payment source in response to declining the request, or denying entry at the second fare gate.

10. The method of claim 9 further comprising writing a secure command to the transit card application.

11. The method of claim 9 further comprising determining whether the secure command is written to the transit card application and increasing the balance in response determining that the secure command is written to the transit card application.

12. The method of claim 9 further comprising displaying a message on a user interface to determine if a user of the mobile device wants the balance increased for the transit card application.

13. The method of claim 9 further comprising informing a user of the mobile device that the balance is below the threshold.

14. The method of claim 9 further comprising enabling a user of the mobile device to set the threshold.

15. The method of claim 9 further comprising enabling a user of the mobile device to set a value for the balance increase.

16. The method of claim 9 wherein the transit card application is a smart card application emulating the transit card application.

17. The method of claim 9 further comprising disabling the transit card application in response to a user of the mobile device reporting a loss of the mobile device.

18. A method for using a transit card application, comprising:

executing a location fix technology for a mobile device to determine a location fix;

calculating a threshold from an anticipated fare expense based on the location fix;

determining whether a balance on a transit card application is below the threshold;

requesting an approval for a balance increase in response to determining that the balance on the transit card application is below the threshold, determining whether a first predetermined payment source has sufficient value for the balance increase in response to the request for the approval from the mobile device;

approving the request in response to determining that the first predetermined payment source has sufficient value for the balance increase;

increasing the balance on the selected transit card application in response to the approval;

displaying a warning message in response to determining that the first predetermined payment source does not have sufficient value for the balance increase.

19. The method of claim 18 wherein the warning message is one of a suggestion to exit at an upcoming fare gate and a suggestion to switch from the first predetermined payment source to a second predetermined payment source.

20. The method of claim 18 the location fix technology comprises one of advanced forward link trilateration, global positioning system, and a hybrid location fix technology.

* * * * *